US012544015B2

(12) United States Patent
Hyson

(10) Patent No.: US 12,544,015 B2
(45) Date of Patent: Feb. 10, 2026

(54) CLINICAL DIAGNOSTIC AND PATIENT INFORMATION SYSTEMS AND METHODS

(71) Applicant: IDEXX Laboratories, Inc., Westbrook, ME (US)

(72) Inventor: Regina Marie Hyson, Gorham, ME (US)

(73) Assignee: IDEXX LABORATORIES, INC., Westbrook, ME (US)

(*) Notice: Subject to any disclaimer, the term of this patent is extended or adjusted under 35 U.S.C. 154(b) by 527 days.

(21) Appl. No.: 18/148,163

(22) Filed: Dec. 29, 2022

(65) Prior Publication Data

US 2023/0210473 A1 Jul. 6, 2023

Related U.S. Application Data

(60) Provisional application No. 63/294,886, filed on Dec. 30, 2021.

(51) Int. Cl.
*A61B 5/00* (2006.01)
*A61B 90/00* (2016.01)
*G16H 10/60* (2018.01)

(52) U.S. Cl.
CPC ............ *A61B 5/743* (2013.01); *A61B 5/7425* (2013.01); *A61B 5/7435* (2013.01); *A61B 5/748* (2013.01); *A61B 90/36* (2016.02); *G16H 10/60* (2018.01); *A61B 2090/367* (2016.02)

(58) Field of Classification Search
CPC ..... A61B 5/743; A61B 5/7425; A61B 5/7435; A61B 5/748; A61B 90/36; A61B 2090/367; G16H 10/60; G16H 10/40; G16H 30/40; G16H 40/20; G16H 40/63; G16H 50/20
See application file for complete search history.

(56) References Cited

U.S. PATENT DOCUMENTS

| 9,420,945 B2* | 8/2016 | Coelho | G16H 40/63 |
| 10,032,236 B2* | 7/2018 | Hawkins | G16H 15/00 |
| 2009/0192823 A1* | 7/2009 | Hawkins | G06Q 10/06 |
| | | | 715/767 |
| 2010/0050110 A1* | 2/2010 | Hughes | G16Z 99/00 |
| | | | 715/781 |
| 2011/0161854 A1* | 6/2011 | Shukla | G16H 30/20 |
| | | | 345/419 |

(Continued)

*Primary Examiner* — Asher D Kells
(74) *Attorney, Agent, or Firm* — ROSSI, KIMMS & McDOWELL LLP

(57) ABSTRACT

A patient information system is described. A virtual representation of a patient is generated using a captured image of the patient. A graphical user interface is displayed on the display, the graphical user interface including a first screen portion configured to display the virtual representation of the patient and a second screen portion configured to display information. A selection of an area of interest is received on the virtual representation of the patient. Clinical and diagnostic information associated with the selected area of interest is received and displayed in the second screen portion of the graphical user interface. The graphical user interface also includes a timeline that displays events of interest. A selection of an event of interest causes the second screen portion of the graphical user interface to display clinical and diagnostic information associated with the selected event of interest.

7 Claims, 12 Drawing Sheets

(56) References Cited

U.S. PATENT DOCUMENTS

| | | | | |
|---|---|---|---|---|
| 2013/0325493 | A1* | 12/2013 | Wong | G16Z 99/00 |
| | | | | 705/2 |
| 2015/0089365 | A1* | 3/2015 | Zhao | G06F 3/04847 |
| | | | | 715/708 |
| 2015/0134361 | A1* | 5/2015 | Molenda | G16H 15/00 |
| | | | | 705/3 |
| 2016/0155236 | A1* | 6/2016 | Davey | G06T 15/08 |
| | | | | 382/131 |
| 2017/0262584 | A1* | 9/2017 | Gallix | G06N 20/00 |
| 2018/0122517 | A1* | 5/2018 | Bessette | G16H 20/30 |
| 2019/0188852 | A1* | 6/2019 | Reicher | G06T 7/0014 |
| 2021/0124465 | A1* | 4/2021 | Sahu | G06F 3/0482 |
| 2021/0295963 | A1* | 9/2021 | Bakshi | G16H 30/40 |
| 2024/0062857 | A1* | 2/2024 | Planche | G16H 50/70 |
| 2024/0331845 | A1* | 10/2024 | Collins | G16H 30/40 |

* cited by examiner

CLINICAL DIAGNOSTIC AND PATIENT INFORMATION SYSTEMS AND METHODS

CROSS REFERENCE TO RELATED APPLICATIONS

This application claims the priority benefit of U.S. Provisional Application No. 63/294,886 filed Dec. 30, 2021, the entire disclosure of which is hereby incorporated herein in its entirety by reference.

TECHNICAL FIELD

The present disclosure is generally related to the field of providing programmatic clinical decision support and more particularly to intelligent user interfaces that summarize and dynamically display a large amount of information in a limited display area for managing patient information and supporting clinical decisions.

BACKGROUND

The veterinary team is responsible for generating and managing an accurate and complete medical chart of a patient's medical history, diagnosis, treatment, and care. The medical chart can include clinical data gathered during patient visits to the veterinarian. Examples of such clinical data include demographic information, vital signs, diagnoses, medications, treatment plans, progress notes, patient problems, vaccines, laboratory results, and radiographs, among others. The patient's medical chart should give the treating veterinarian, or any other clinician, a complete and full understanding of everything that occurred previously to the patient in order to help the veterinarian diagnose any current problems, manage treatment plans, and determine future health care strategies for the patient.

Many veterinarians and clinics struggle to obtain an overall picture of the patient's health due to the vast amount of health information stored in different systems and accessed using different user interfaces. Conventional practices often involve scrolling through potentially numerous invoice-driven patient data, that each provides some information about the patient's health and history at a given isolated time. Often, the veterinary team has to access multiple different systems that store different data—for example, a clinical visit system that stores information about past clinical visits, a diagnostic system that stores information about diagnostic tests run on a patient, an imaging system that stores patient scans, a billing system etc. This disjointed information makes it very difficult for the treating veterinarian to obtain a complete and full understanding of everything that occurred previously to the patient, and make informed decisions about current and future patient care.

Accordingly, a more effective system is needed for providing veterinarians and clinicians with a complete understating of the patient's medical chart, clinical and diagnostic information, medical history, disease progression, care recommendation, etc. on one user interface screen.

SUMMARY

At least the above-discussed need is addressed and technical solutions are achieved in the art by various embodiments described in the present disclosure. Some embodiments of the present disclosure pertain to a patient information system comprising an image capture device configured to capture an image of a patient, a display, a memory configured to store a program, and a processor communicatively connected to the memory and configured to execute the program to: generate a virtual representation of the patient based on the image of the patient captured by the image capture device, display a graphical user interface on the display, the graphical user interface including a first screen portion configured to display the virtual representation of the patient and a second screen portion configured to display information; receive a selection of an area of interest on the virtual representation of the patient; receive first clinical and diagnostic information associated with the selected area of interest; and display the received first clinical and diagnostic information in the second screen portion of the graphical user interface.

In some embodiments, the graphical user interface includes a third screen portion displaying a timeline associated with the patient information. In some embodiments, the processor is configured to further execute the program to: receive a selection of a time period on the timeline; receive second clinical and diagnostic information associated with the selected time period; and display the received second clinical and diagnostic information in the second screen portion of the graphical user interface instead of the received first clinical and diagnostic information.

In some embodiments, the processor is configured to further execute the program to display, on the virtual representation of the patient, one or more visual indicators indicating one or more areas of interest associated with the received second clinical and diagnostic information.

In some embodiments, the system includes a plurality of databases configured to store clinical and diagnostic information, including the first clinical and diagnostic information and the second clinical and diagnostic information, for the patient.

In some embodiments, the processor is configured to further execute the program to display, on the virtual representation of the patient, one or more visual indicators indicating one or more areas of interest associated with the stored clinical and diagnostic information for the patient.

In some embodiments, the processor is configured to further execute the program to display, in the second screen portion of the graphical user interface, one or more icons corresponding to one or more areas of interest associated with the stored clinical and diagnostic information for the patient. In some embodiments, the one or more icons depict one or more organs of the patient.

In some embodiments, the processor is configured to further execute the program to: receive a selection of an icon displayed in the second screen portion of the graphical user interface; receive third clinical and diagnostic information associated with the selected icon; and display the received third clinical and diagnostic information in the second screen portion of the graphical user interface.

In some embodiments, the stored clinical and diagnostic information includes at least one of diagnoses, medications, treatment plans, progress notes, patient problems, vaccines, test results, and imaging data.

In some embodiments, the virtual representation of the patient is a photo-realistic representation generated by texture mapping one or more photographic images of the patient to a 3D model of the patient.

In some embodiments, the graphical user interface includes a fourth screen portion displaying patient demographic information.

In some embodiments, the graphical user interface includes a fifth screen portion displaying clinical visit information.

Some embodiments of the present disclosure pertain to a processor executed patient information display method comprising: capturing an image of a patient; generating a virtual representation of the patient based on the captured image of the patient; displaying a graphical user interface on a display, the graphical user interface including a first screen portion configured to display a virtual representation of a patient and a second screen portion configured to display information; receiving a selection of an area of interest on the virtual representation of the patient; receiving first clinical and diagnostic information associated with the selected area of interest; and displaying the received first clinical and diagnostic information in the second screen portion of the graphical user interface.

In some embodiments, the method further comprises: displaying, on a third screen portion of the graphical user interface, a timeline associated with the patient information; receiving a selection of a time period on the timeline; receiving second clinical and diagnostic information associated with the selected time period; and displaying the received second clinical and diagnostic information in the second screen portion of the graphical user interface instead of the received first clinical and diagnostic information.

In some embodiments, the method further comprises displaying, on the virtual representation of the patient, one or more visual indicators indicating one or more areas of interest associated with the received second clinical and diagnostic information.

In some embodiments, the method further comprises receiving the first clinical and diagnostic information and the second clinical and diagnostic information for the patient from a plurality of databases configured to store clinical and diagnostic information.

In some embodiments, the method further comprises displaying, on the virtual representation of the patient, one or more visual indicators indicating one or more areas of interest associated with the stored clinical and diagnostic information for the patient.

In some embodiments, the method further comprises displaying, in the second screen portion of the graphical user interface, one or more icons corresponding to one or more areas of interest associated with the stored clinical and diagnostic information for the patient. In some embodiments, the one or more icons depict one or more organs of the patient.

In some embodiments, the method further comprises: receiving a selection of an icon displayed in the second screen portion of the graphical user interface; receiving third clinical and diagnostic information associated with the selected icon; and displaying the received third clinical and diagnostic information in the second screen portion of the graphical user interface.

In some embodiments, the stored clinical and diagnostic information includes at least one of diagnoses, medications, treatment plans, progress notes, patient problems, vaccines, test results, and imaging data.

In some embodiments, the virtual representation of the patient is a photo-realistic representation generated by texture mapping one or more photographic images of the patient to a 3D model of the patient.

In some embodiments, the method further comprises displaying patient demographic information on a fourth screen portion of the graphical user interface.

In some embodiments, the method further comprises displaying clinical visit information on a fifth screen portion of the graphical user interface.

Some embodiments of the present disclosure pertain to a non-transitory computer readable storage medium configured to store a program that executes the patient information display method, according to the embodiments discussed above.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

DETAILED DESCRIPTION

Figure 1:
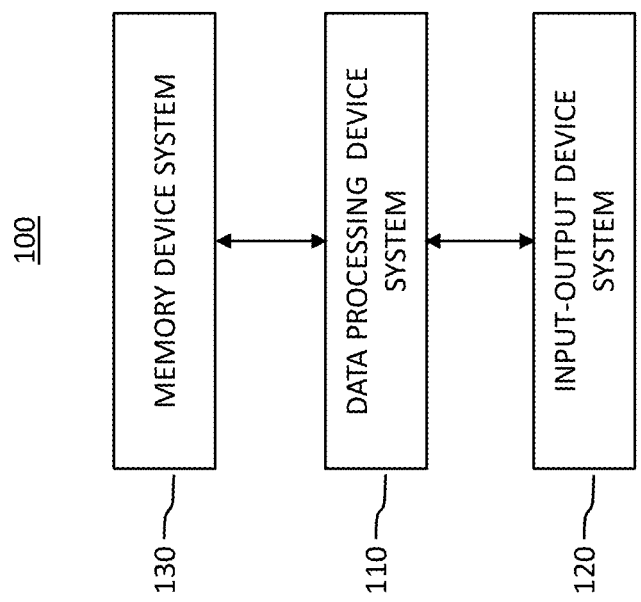
FIG. 1 shows a computing device system, according to some embodiments of the present disclosure.

In some embodiments, the computer systems described herein execute methods for summarizing, generating, managing, and displaying a patient's medical chart using dynamic and customizable graphical user interfaces that permit a veterinarian or clinician to get a holistic understanding of a patient's medical chart, including past and present medical history, and future care, in a limited information display area. It should be noted that the disclosure is not limited to these embodiments, or any other examples provided herein, which are referred to for purposes of illustration only.

In this regard, in the descriptions herein, certain specific details are set forth to provide a thorough understanding of various embodiments of the disclosure. However, one skilled in the art will understand that the embodiments of the present disclosure may be practiced at a more general level without one or more of these details. In other instances, well-known structures have not been shown or described in detail to avoid unnecessarily obscuring descriptions of various embodiments of the disclosure.

Any reference throughout this specification to "one embodiment", "an embodiment", "an example embodiment", "an illustrated embodiment", "a particular embodiment", "one aspect", "an aspect", "an example aspect", "an illustrated aspect", "a particular aspect" and the like means that a particular feature, structure or characteristic described in connection with the embodiment is included in at least one embodiment or aspect. The phrases embodiment and aspect may be used interchangeably in the disclosure. Thus, any appearance of the phrase "in one embodiment", "in an embodiment", "in an example embodiment", "in this illustrated embodiment", "in this particular embodiment", or the like in this specification is not necessarily all referring to one embodiment or aspect, or a same embodiment or aspect. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present disclosure may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 151, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. However, non-usage of the phrase "or a derivative thereof" or the like nonetheless includes derivatives or modifications of information or data just as usage of such a phrase does, as such a phrase, when used, is merely used for emphasis.

Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Figure 12:
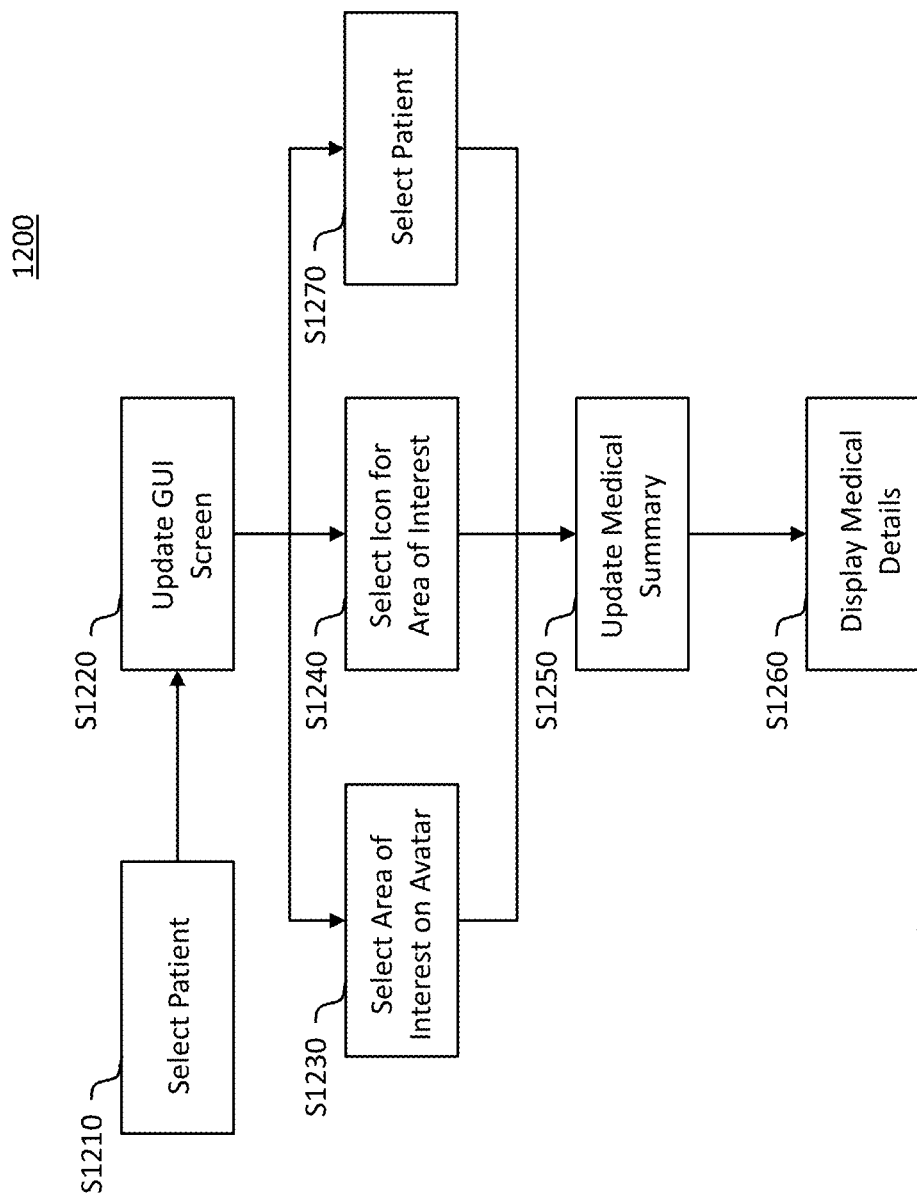
FIG. 12 shows a flowchart of a patient information display method, according to some embodiments of the present disclosure.

Further still, example methods are described herein with respect to FIG. 12. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIG. 12 herein is not limited to an actual structure of any program or set of instructions or required ordering of method tasks, and such method FIG. 12, according to some embodiments, merely illustrates the tasks that instructions are configured to perform, for example upon execution by a data processing device system in conjunction with interactions with one or more other devices or device systems.

Figure 2:
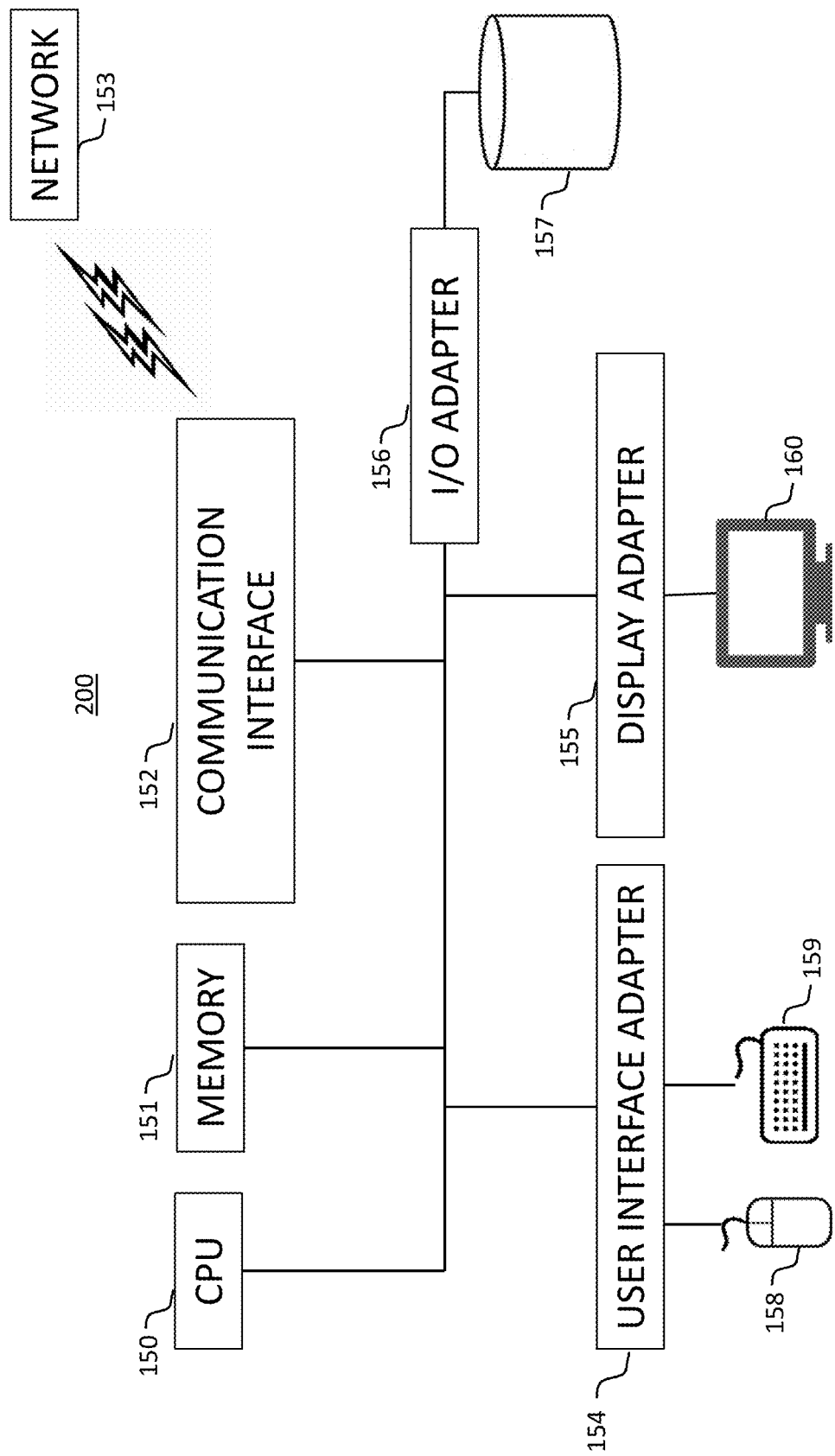
FIG. 2 shows another computing device system, according to some embodiments of the present disclosure.

FIG. 1 schematically illustrates a system 100 according to some embodiments. In some embodiments, the system 100 is a computing device 200 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 includes a processor 150, corresponding to the data processing device system 110 of FIG. 1, in some embodiments. The memory 151, input/output (I/O) adapter 156, and non-transitory storage medium 157 may correspond to the memory device system 130 of FIG. 1, according to some embodiments. The user interface adapter 154, mouse 158, keyboard 159, display adapter 155, and display 160 may correspond to the input-output device system 120 of FIG. 1, according to some embodiments. The computing device 200 may also include a communication interface 152 that connects to a network 153 for communicating with other computing devices 200.

Various methods 1200 (FIG. 12) may be performed by way of associated computer-executable instructions according to some example embodiments. In various example embodiments, a memory device system (e.g., memory device system 130 of FIG. 1) is communicatively connected to a data processing device system (e.g., data processing device systems 110 of FIG. 1, otherwise stated herein as "e.g., 110") and stores a program executable by the data processing device system to cause the data processing device system to execute various embodiments of methods 1200 (FIG. 12) via interaction with at least, for example, various databases 320, 330, 340, 350 shown in FIG. 3. In these various embodiments, the program may include instructions configured to perform, or cause to be performed, various ones of the instructions associated with execution of various embodiments of methods 1200 (FIG. 12). In some embodiments, methods 1200 (FIG. 12) may include a subset of the associated blocks or additional blocks than those shown in FIG. 12. In some embodiments, methods 1200 (FIG. 12) may include a different sequence indicated between various ones of the associated blocks shown in FIG. 12.

Figure 3:
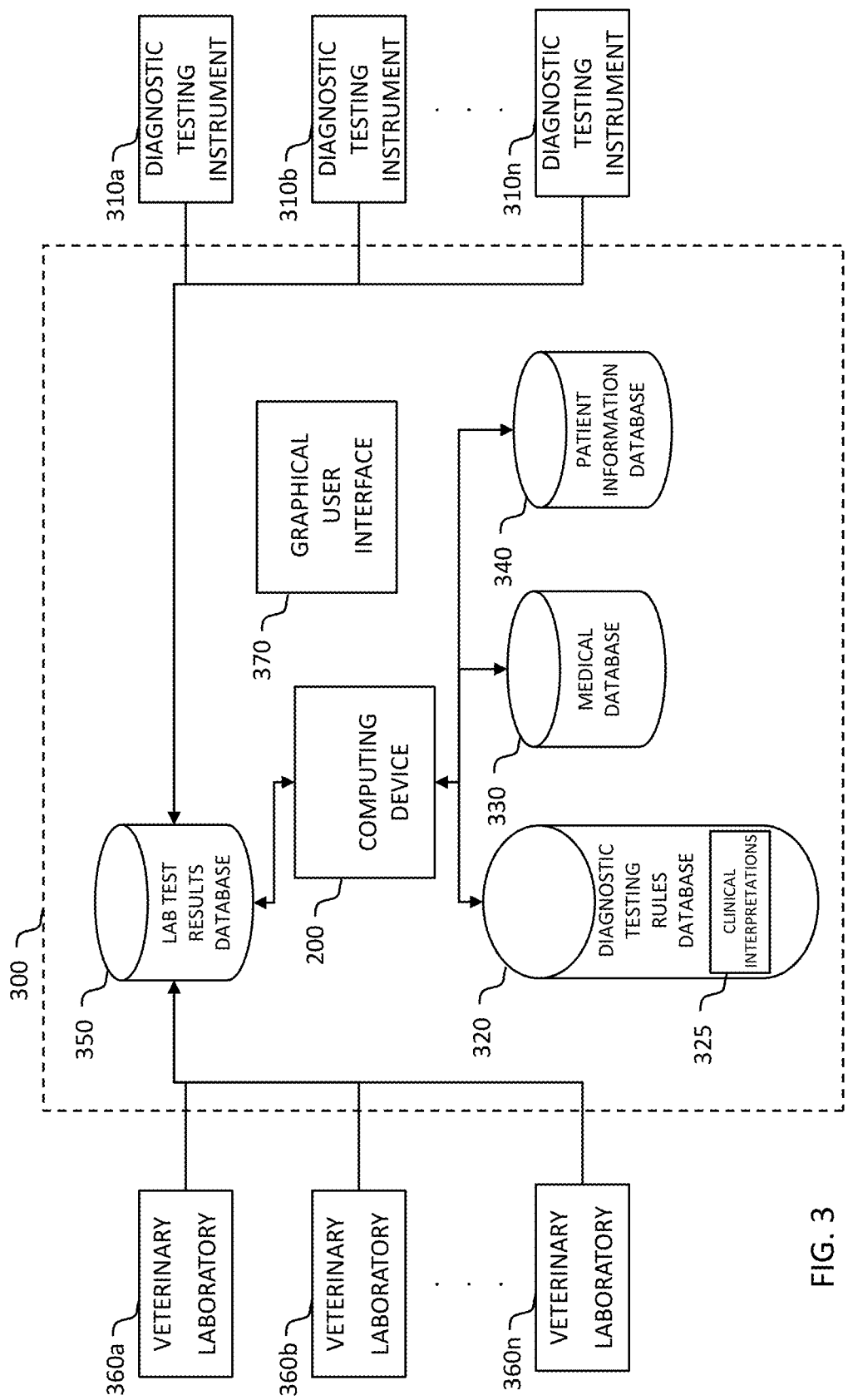
FIG. 3 shows a block diagram of a patient information management system, according to some embodiments of the present disclosure.

FIG. 3 shows an example of a clinical diagnostic and patient information system 300, according to some embodiments. According to some embodiments of the present disclosure, the systems 100, 200 shown in FIGS. 1 and 2, respectively, include some or all of the system 300 shown in FIG. 3, or vice versa. In this regard, FIG. 3 illustrates a system 300, according to some embodiments of the present disclosure. The system 300 may be a particular implementation of the systems 100, 200 shown in FIGS. 1 and 2, respectively, according to some embodiments. In various example embodiments, the clinical diagnostic and patient information system 300 may include the computing device system 200. In various example embodiments, the clinical diagnostic and patient information system 300 may also include one or more diagnostic testing instruments 310a-n coupled to and in communication with the computing device system 200. The computing device system 200 may be in wired or wireless communication with the one or more diagnostic testing instruments 310a-n (e.g., some may be in wired Ethernet communication and others may use Wi-Fi communication). Although four diagnostic testing instruments are shown, more or fewer diagnostic testing instruments may be included in the system 300.

In some embodiments, the clinical diagnostic and patient information system 300 may include a two-way laboratory hub communicatively connected to the computing device system 200, and the diagnostic testing instruments 310a-n may be veterinary analyzers operable to conduct a diagnostic test of a sample of a patient. In one example, the system 300 is in communication with the veterinary analyzer and is operable to control operation of the veterinary analyzer. The diagnostic testing instruments 310a-n output signals, such as diagnostic test results, or other information to the system 300. In some embodiments, the diagnostic testing instruments 310a-n may be any one or combination of a clinical chemistry analyzer, a hematology analyzer, a urine analyzer, an immunoassay reader, a sediment analyzer, a blood analyzer, and a digital radiology machine. In some embodiments, the system 300 includes a clinical patient portal system and the diagnostic testing instruments 310a-n may be veterinary analyzers operable to conduct a diagnostic test of a sample of a patient in a clinical setting. In some embodiments, the clinical diagnostic and patient information system may receive and store information on various diagnostic tests performed by the diagnostic testing instruments 310a-n.

In some embodiments, the clinical diagnostic and patient information system 300 may include one or more databases that store information used by the clinical diagnostic and patient information system to generate the patient's medical chart. The one or more databases are communicatively connected to the computing device system 200. In some embodiments, a diagnostic testing rules database 320 stores a plurality of rules for performing diagnostic testing and interpreting diagnostic test results. The diagnostic testing rules database 320 includes a set of clinical interpretations 325 of associated diagnostic tests. Each clinical interpretation 325 may be associated with a diagnosis or a treatment plan. Each clinical interpretation 325 may also be associated with observed clinical signs and symptoms in the patient. In some embodiments, the diagnostic tests may be performed using one or more veterinary laboratories 360a-360n or one or more diagnostic testing instruments 310a-n.

In some embodiments, a medical database 330 stores medical data such as ranges of normal, low, and high test results for various diagnostic tests performed by the one or more veterinary laboratories 360a-360n or the one or more diagnostic testing instruments 310a-n. In some embodiments, the computing device system 200 may access the medical database 330 to compare test results with the typical ranges stored in the medical database to interpret the test results from the one or more veterinary laboratories 360a-360n or the one or more diagnostic testing instruments 310a-n.

In some embodiments, a patient information database 340 stores a patient's medical history, including patient demographic information, vital signs at each visit, diagnoses, medications, treatment plans, progress notes, patient problems, vaccines, test results, and imaging data such as radiographs. The demographic data may include species, weight, and age, for example.

In some embodiments, the diagnostic testing instruments 310a-n may be positioned in a veterinary laboratory rather than a veterinary clinic. In some embodiments, the system 300 may be communicatively connected to one or more veterinary laboratories 360a-n. In some embodiments, the veterinary laboratories 360a-n may store diagnostic test information in a lab test results database 350. The lab results database 350 may also store associated information including symptoms for various diseases and follow-on testing performed in each situation. In some embodiments, the system 300 may access the lab test results database 350 to learn what the other veterinary laboratories 360a-n have done in some instances and leverage success and failures of the other veterinary laboratories 360a-n when generating recommendations for any follow-on testing. In some embodiments, the system 300 may be communicatively connected to one or more diagnostic testing instruments 310a-n irrespective of whether they are located in a veterinary clinic or a veterinary laboratory. In some embodiments, the diagnostic testing instruments 310a-n may store diagnostic test information in the lab test results database 350.

In some embodiments, the clinical diagnostic and patient information system 300 includes a graphical user interface 370 that dynamically displays different information of the patient's medical chart on a display of a computing device, in response to user selection (and movement of user pointer) on the display.

Figure 4:
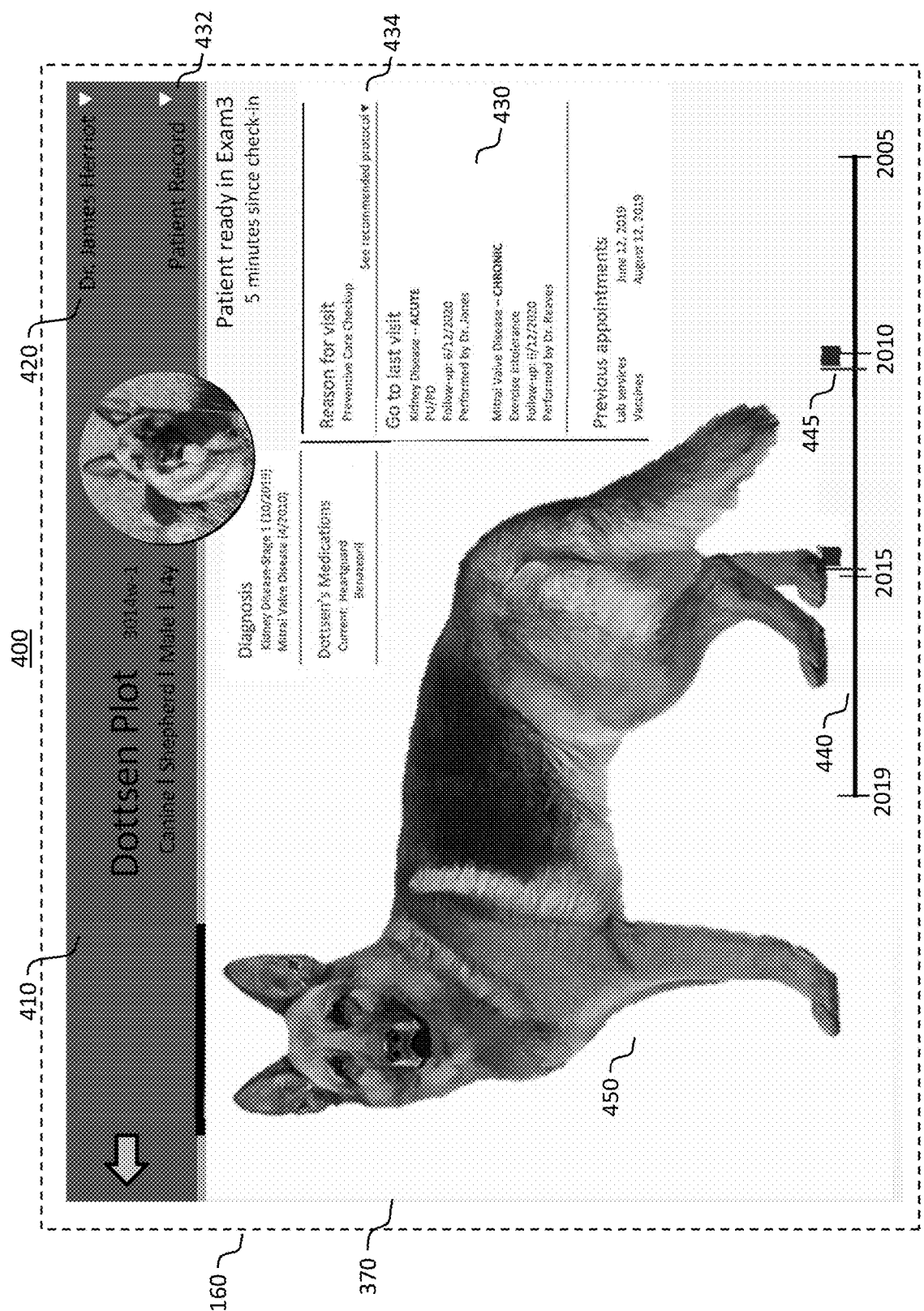
FIG. 4 shows an example graphical user interface screen of the patient information management system, according to some embodiments of the present disclosure.

FIG. 4 shows an example of a main patient medical chart screen 400 displayed on the graphical user interface 370 of the clinical diagnostic and patient information system 300 (FIG. 3). In some embodiments, the screen 400 includes a first display area 410 that displays demographic information about the patient. The demographic information may include one or more of a patient name, species, gender, age, weight, and identifier. In some embodiments, the patient identifier may uniquely identify each patient in the clinical diagnostic and patient information system 300. In some embodiments, the first display area 410 may also include a thumbnail image of the patient.

In some embodiments, the screen 400 includes a second display area 420 that displays current clinical visit information about the patient. The current clinical visit information may include one or more of the veterinarian's name, waiting time for the patient, and location (exam room) where the patient is waiting. The second display area 420 may also include a selectable button, icon, or pull-down menu item for the user to select the patient record.

In some embodiments, the screen 400 includes a third display area 430 that displays one or more pieces of information of the patient's medical history including diagnoses information for any current diseases or conditions, list of medications, reason for current visit, summary of the last visit, and a history of previous appointments. In some embodiments, the third display area 430 provides a summary of the patient's medical history for the veterinarian to quickly understand current and future medical care for the patient. In some embodiments, the summary information is automatically generated using the diagnoses information for any current diseases or conditions, list of medications, reason for current visit, summary of the last visit, and a history of previous appointments. In some embodiments, the summary information changes in response to movement of the pointer 610 on the screen 400. For example, when the pointer is near a knee joint of the patient in the virtual representation in the first display area 410, the summary information displayed in the third display area 430 corresponds to diagnostic and medical history information for the knee. When the pointer is near the kidney area of the patient in the virtual representation (virtual avatar 450) in the first display area 410, the summary information displayed in the third display area 430 automatically changes to diagnostic and medical history information for the kidney. This intelligent summarization and display permits the user interface screen to dynamically display a large amount of medical information for the patient using a small display area. Even in the case where the medical information for the patient information would not otherwise fit on the display screen, the dynamically generated summaries displayed in the third display area 430 provide all of the necessary information to permit the veterinarian to get a holistic view of the patient's medical history. The systems described herein provide a technical solution for summarizing and dynamically displaying a large amount of information on a small display area, and improve digital user interface technology.

In some embodiments, the summary of the patient's medical data may include information from a Patient Information Management System (PIMS data), pet owner supplied data, pet tracking device data, diagnostic data, and telehealth data.

In some embodiments, the screen 400 includes a timeline 440 that can be used by the veterinarian to access more detailed information about the patient's medical history at particular times. In some embodiments, the timeline 440 includes clickable icons 445, such as flags, that mark a change in the patient's medical conditions.

Figure 5:
FIG. 5 shows an example process of generating a photo-realistic representation of a patient, according to some embodiments of the present disclosure.

In some embodiments, the screen 400 includes a virtual avatar 450 of the patient. In some embodiments, the virtual avatar 450 may be generated using a picture (image) of the patient captured by an image capture device (camera or cell phone), as shown in FIG. 5. In some embodiments of the present disclosure, the thumbnail image of the patient included in the first display area 410 may also be generated using the captured picture of the patient. In some embodiments, texture mapping techniques, well known in the art, may be used to generate a photo-realistic virtual representation of the patient using a computer-generated graphic or model, that is common for the patient's species, and overlaying high-frequency detail, surface texture, or color information from the captured image of the patient onto the computer-generated graphic or model.

In some embodiments, the texture mapping may be performed by unwrapping a 3D model of the patient to a 2D mesh surface and deriving a correspondence between the unwrapped 2D surface and 2D images of the patient. Since image textures obtained from photographs of the patient are two-dimensional data, a mapping is needed from the 3D model of the object to the 2D space of the texture. The mapping defines which texture pixel, also called "texel", is displayed on the 2D mesh's face. The process of creating this mapping is called UV-unwrapping. Intuitively, a 3D mesh representing a 3D model of the patient is cut open at some edges so that its 3D shape can be unfolded into a 2D flat surface. The image texture, obtained from photographs of the patient, is applied to this flat representation. Then, the edges that were opened are closed back to obtain the 3D mesh (3D patient model) with the texture added to the surfaces of the model.

In some embodiments, each vertex of the 3D mesh is mapped to a 2D vertex in the texture space, generating connectivity data between the 3D model and the 2D textures. The 2D texture space is also called UV-space; the two axes are labelled with U and V instead of X and Y. This distinguishes the UV-coordinates which are associated with a texture with points in the 3D object. UV-coordinates range from 0 to 1 with the point (0,0) at the left bottom of the image and (1,1) at the top right. This also means that UV-points are independent of the texture resolution and are scaled with the image. When UV-unwrapping a 3D model, its faces are laid out on the texture. Good UV-unwrappings minimize the amount of stretching. Stretching occurs if the shape of an object is distorted in the UV-space. Especially curved surfaces, like a sphere, may be difficult to UV-unwrapping without stretched textures.

Various techniques, well known in the art, may be used to automatically correct distortions in the mapped textures, resulting from stretching. Alternately, a user can make manual corrections on the mapped textures to create a good photo-realistic mapping from the captured 2d photographs/images to the 3D model.

Figure 6:
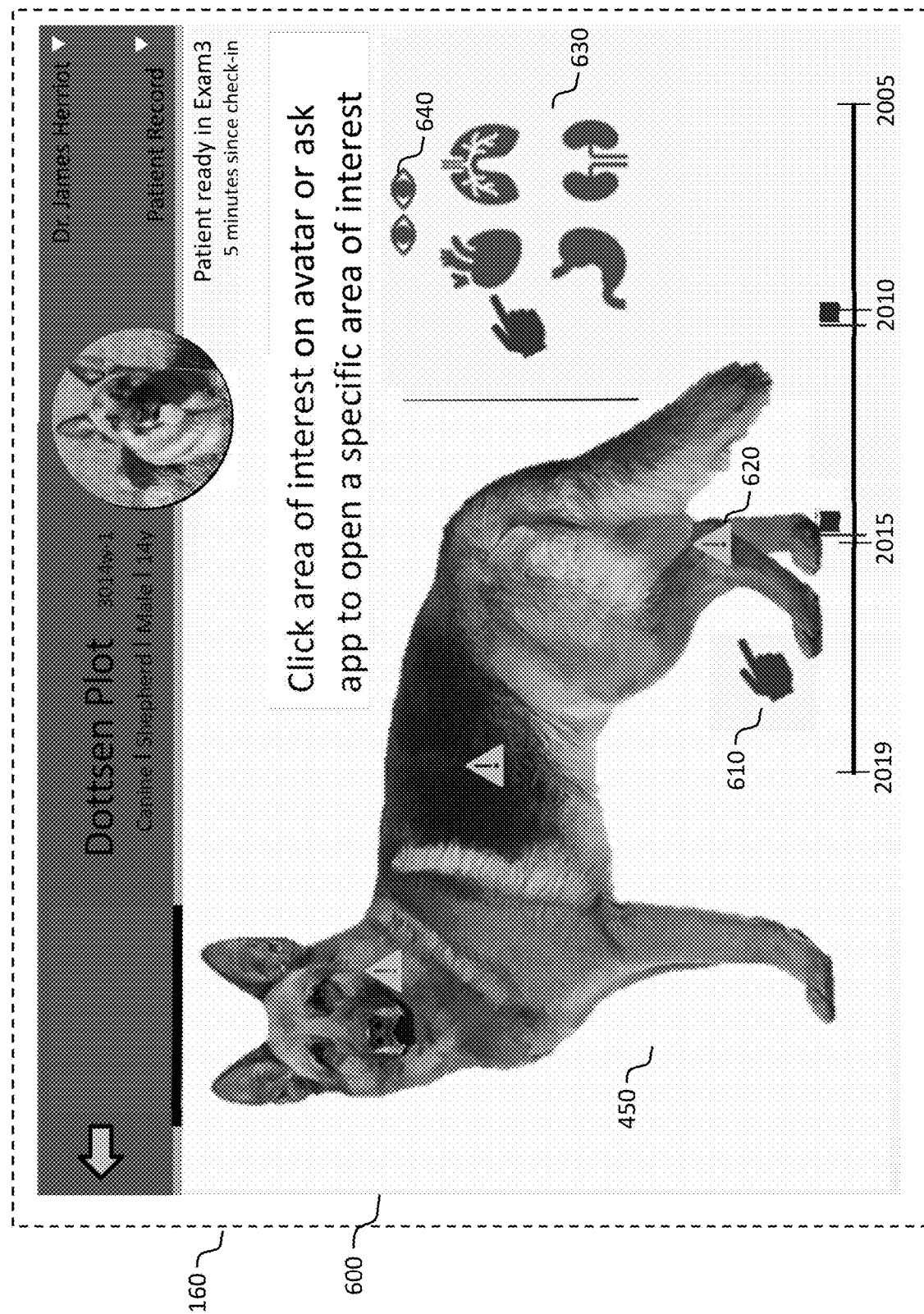
FIG. 6 shows another example graphical user interface screen of the patient information management system, according to some embodiments of the present disclosure.

In some embodiments, the graphical user interface 370 includes a cursor or pointer 610 (FIG. 6) that moves on the display in response to user control using a pointer device such as a mouse. In some embodiments, the user may use the pointer 610 (FIG. 6) to select a patient record button, icon, or menu item 432 in the second display area 420 to display an area of interest selection screen 600, as shown in FIG. 6. In some embodiments and referring to FIG. 6, the screen 600 includes a fourth display area 630 that displays icons 640 corresponding to various organs, such as eyes, heart, lungs, kidney, and stomach. In some embodiments, the third display area 430 is dynamically changed to instead display the fourth display area 630 on the graphical user interface in response to user interaction. In some embodiments, the user may move the pointer 610 to the fourth display area 630 to select one of the icons 640 organs to obtain medical conditions, diagnoses, or treatments associated with that organ. In some embodiments, the screen 600 displays one or more selectable areas of interest 620 on the avatar 450. The selectable areas of interest correspond to one or more current or past medical conditions, diagnoses, or treatments for the patient. In some embodiments, the user may use the pointer 610 to select one of the areas of interest 620 to obtain more information about the medical conditions, diagnoses, or treatments associated with that area of interest.

Alternately, in some embodiments, a user may move the pointer 610 so that it hovers over the avatar 450 while the main screen 400 (FIG. 4) is displayed. In some embodiments, the user may select the avatar 450 by either hovering over the avatar 450 with the pointer 610 or clicking a mouse button while the pointer 610 is in the vicinity of the avatar 450. In some embodiments, selecting the avatar 450 displays the area of interest selection screen 600, shown in FIG. 6.

Figure 7:
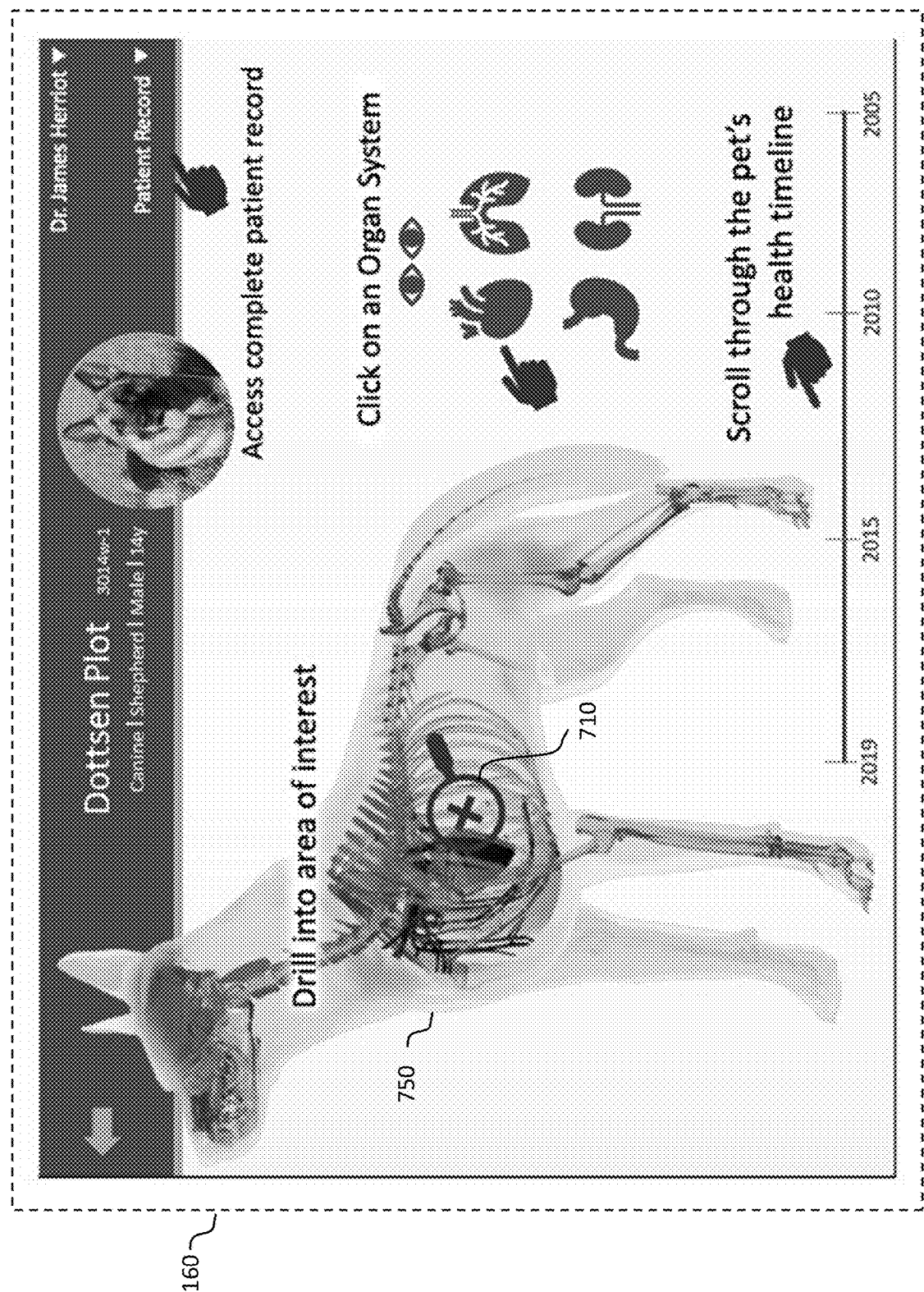
FIG. 7 shows another example graphical user interface screen of the patient information management system, according to some embodiments of the present disclosure.

In some embodiments, the graphical user interface 370 may display a skeletal outline 750 instead of a photo-realistic avatar 450 of the patient, as shown in FIG. 7. In some embodiments, the pointer 610 (FIG. 6) may be replaced by another icon such as a magnifying glass 710, that the user can select or hover over a particular portion of the skeletal outline 750 (or photo-realistic avatar 450) to obtain more information about the medical conditions, diagnoses, or treatments associated with an area of interest on the outline 750. In some embodiments, as the user moves the pointer 610 over different portions of the outline 750 or avatar 450, the third display area 430 is automatically updated to display medical and diagnostic information associated with the portion over which the pointer 610 is hovering. In some embodiments, while the skeletal outline 750 is displayed on the graphical user interface 370, the user may use the pointer 610 (FIG. 6) to scroll through the timeline 440. As the user scrolls through the timeline, various medical events 445, corresponding to the location of the pointer on the timeline 440, are displayed on the outline 750. In some embodiments, scrolling through the timeline 440 causes the appearance of the photo-realistic avatar 450 (FIG. 6) of the patient to change in correspondence with the timeline. For example, the appearance of the patient ages as the timeline is scrolled to later years. In some embodiments, as the user scrolls through the timeline 440, the third display area 430 is automatically updated to display medical and diagnostic information associated with the time period over which the pointer 610 is hovering. In some embodiments, the information displayed in the third display area 430 is collected from various medical information data sources 320-350, and automatically summarized to fit within the third display area 430, each time the pointer 610 moves to a different portion of the outline 750 or avatar 450.

Figure 8:
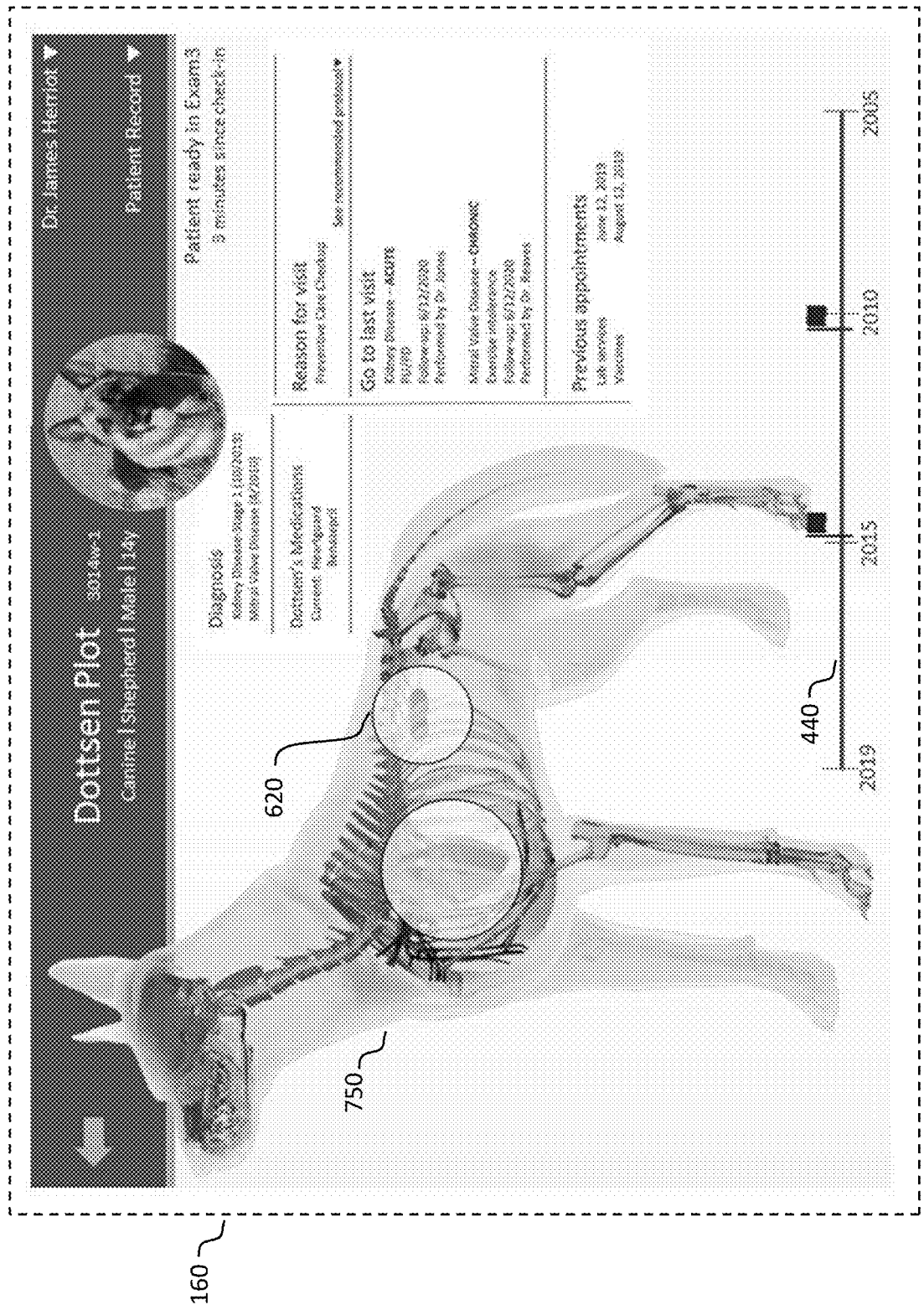
FIG. 8 shows another example graphical user interface screen of the patient information management system, according to some embodiments of the present disclosure.

In one embodiment, as shown in FIG. 8, the main screen 400 (FIG. 4) of the graphical user interface 370 may display the skeletal outline 750 instead of the avatar 450. Further, in some embodiments, areas of interest 620 may be marked on the outline using other icons such as circular boundaries around affected organs. It is evident to one of ordinary skill in the art that various combinations of avatars and icons may be displayed on various screens of the graphical user interface to permit the user to personalize the graphical user interface 370 (FIG. 4) according to their preferences.

Figure 9:
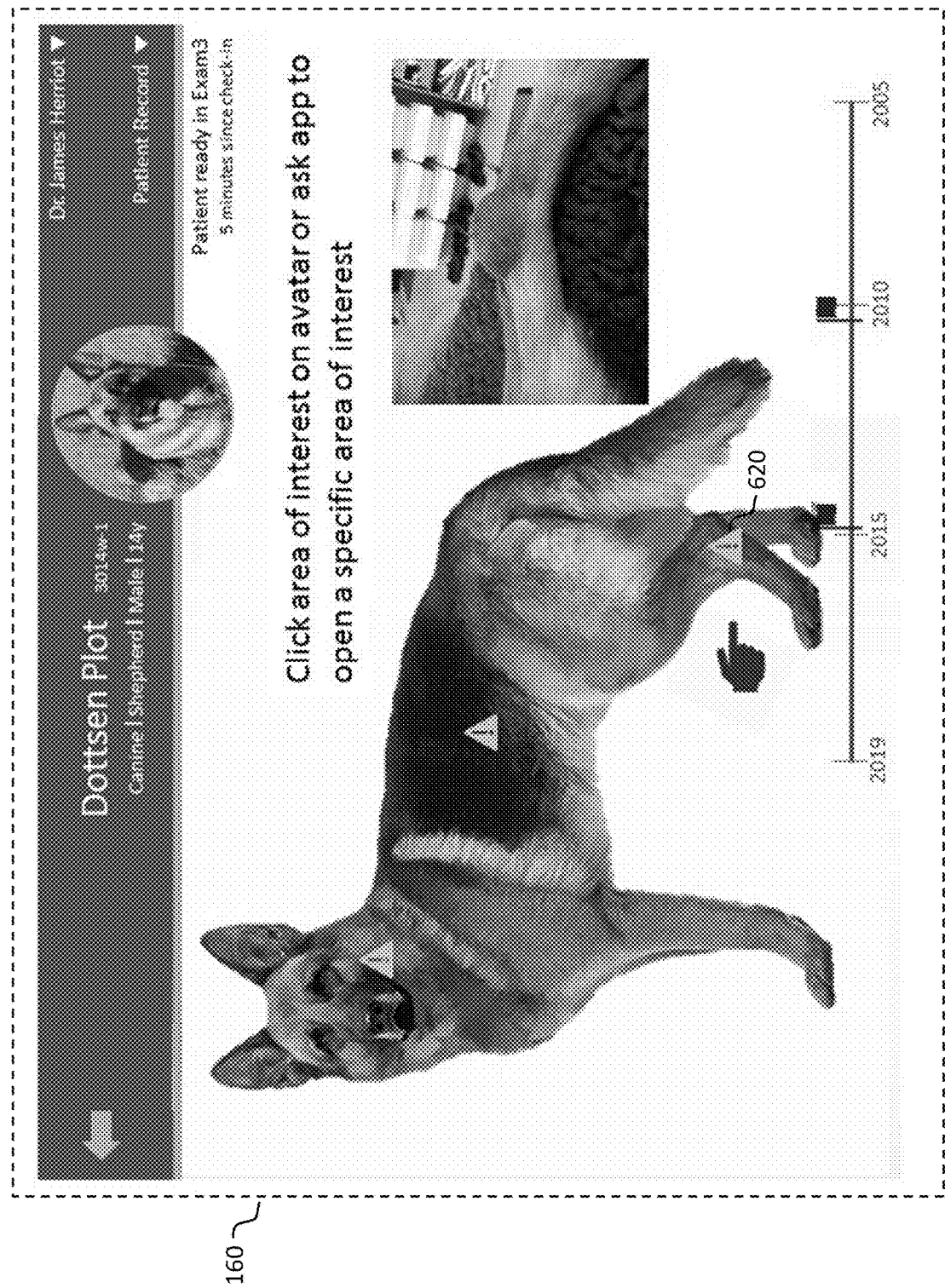
FIG. 9 shows another example graphical user interface screen of the patient information management system, according to some embodiments of the present disclosure.
Figure 10:
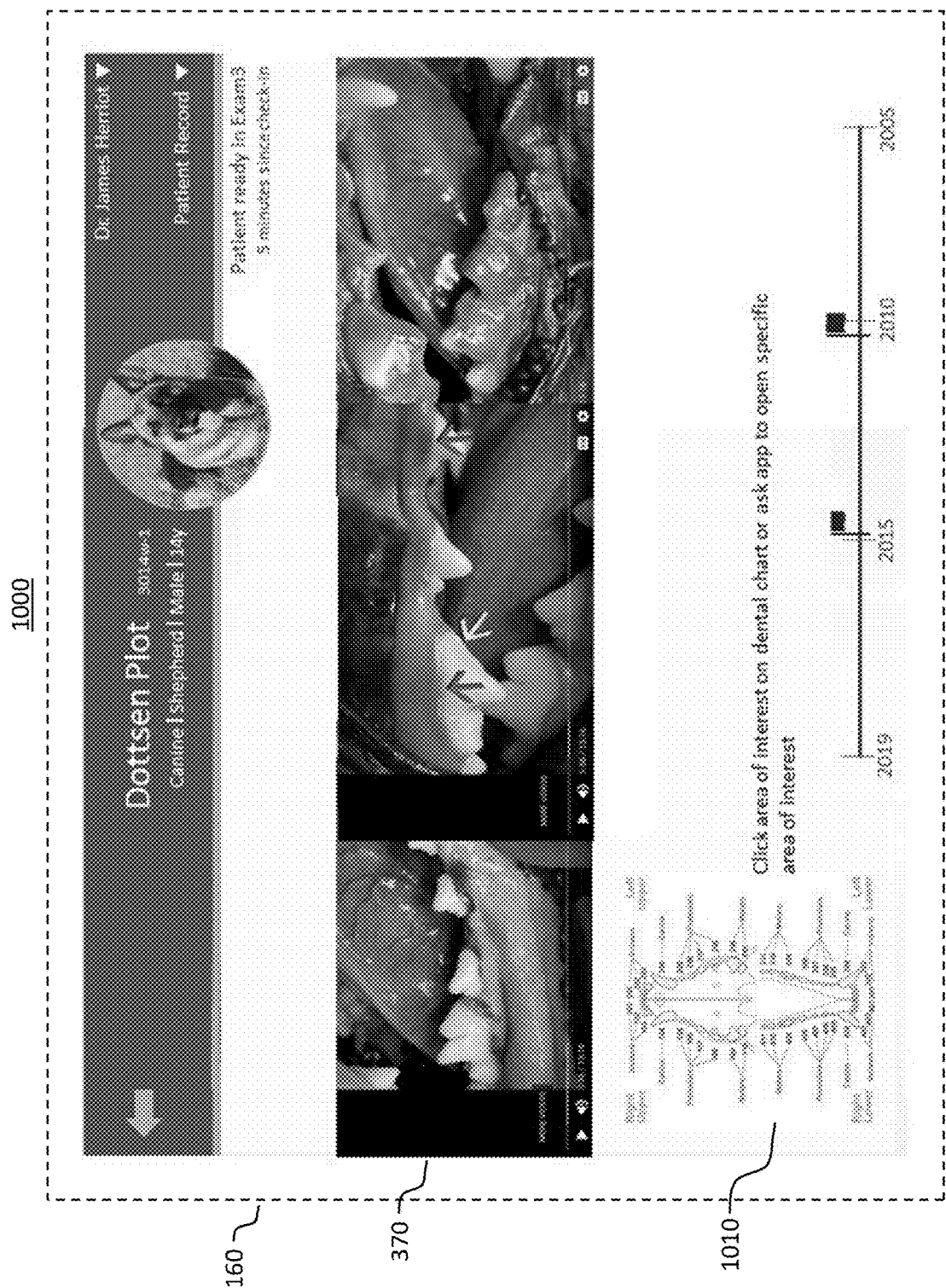
FIG. 10 shows another example graphical user interface screen of the patient information management system, according to some embodiments of the present disclosure.

In some embodiments, hovering the pointer 610 over or selecting an area of interest 620 displays more detailed medical information for that area of interest, as shown in FIGS. 9 and 10. The detailed medical information may include photographs or radiographs showing the medical condition and its progress over time, current treatment plans, future treatment recommendations, test results, and detailed diagnosis information. For example, as shown in FIG. 9, selecting an area of interest 620 corresponding to a knee joint displays an image of the patient's knee taken in the past. If multiple images have been taken over time, to track progress of the medical condition, these may be displayed on the graphical user interface screen of FIG. 9 in the form of a progression, such as a time-lapse video.

In another example, as shown in FIG. 10, selecting an area of interest 620 corresponding to the patient's teeth displays a screen 1000 that includes yearly photos of dental evaluation. These photos may be animated through time to show progression of dental disease. The graphical user interface 370 permits the user to annotate the displayed images, or video. In some embodiments, the screen 1000 includes a dental chart 1010 that is user-selectable to show additional detailed information about a particular tooth or dental area. Similar hierarchical displays may be generated for other organs or bodily systems, along a user to navigate through the patient's medical chart from an overall summary view to various levels of detailed views. For example, the screen 1000 may display summaries of various test results. Selecting one of the summaries may display a new screen showing detailed information associated with the selected summary. For example, as shown in FIG. 10, yearly photos of dental evaluation would be pulled into a client facing video to show the progression of dental disease. The video could be annotated on to show area of interest In another alternate embodiment, the user may use voice controls instead of pointer 610 (FIG. 6) to select one or more of the avatar 450 (FIG. 4), the icons 445 (FIG. 4) on the timeline 440 (FIG. 4), the selectable areas of interest 620 (FIG. 6), or the icons 640 (FIG. 6) corresponding to various organs on the graphical user interface 370 (FIG. 4). In some embodiments, the user may navigate between various screens of the graphical user interface 370 (FIG. 4) using voice commands. In some embodiments, the user may use voice commands to record exam findings. In some embodiments, the graphical user interface 370 (FIG. 4) may be displayed on a mobile device, such as a tablet or phone, capable of receiving voice commands. In some embodiments, a voice activated device, such as a smart watch, may be connected to the computing device and used to interact with the graphical user interface 370 (FIG. 4) displayed on the display of the computing device.

In another alternate embodiment, the user may use a touch screen interface to interact with the graphical user interface. In this embodiment, the graphical user interface 370 (FIG. 4) may not display a pointer or cursor. Rather, a user may use a touch point (finger tip, electronic pen or other touch devices operating as input to the touch screen) to interact with various screens of the graphical user interface 370 (FIG. 4).

Figure 11:
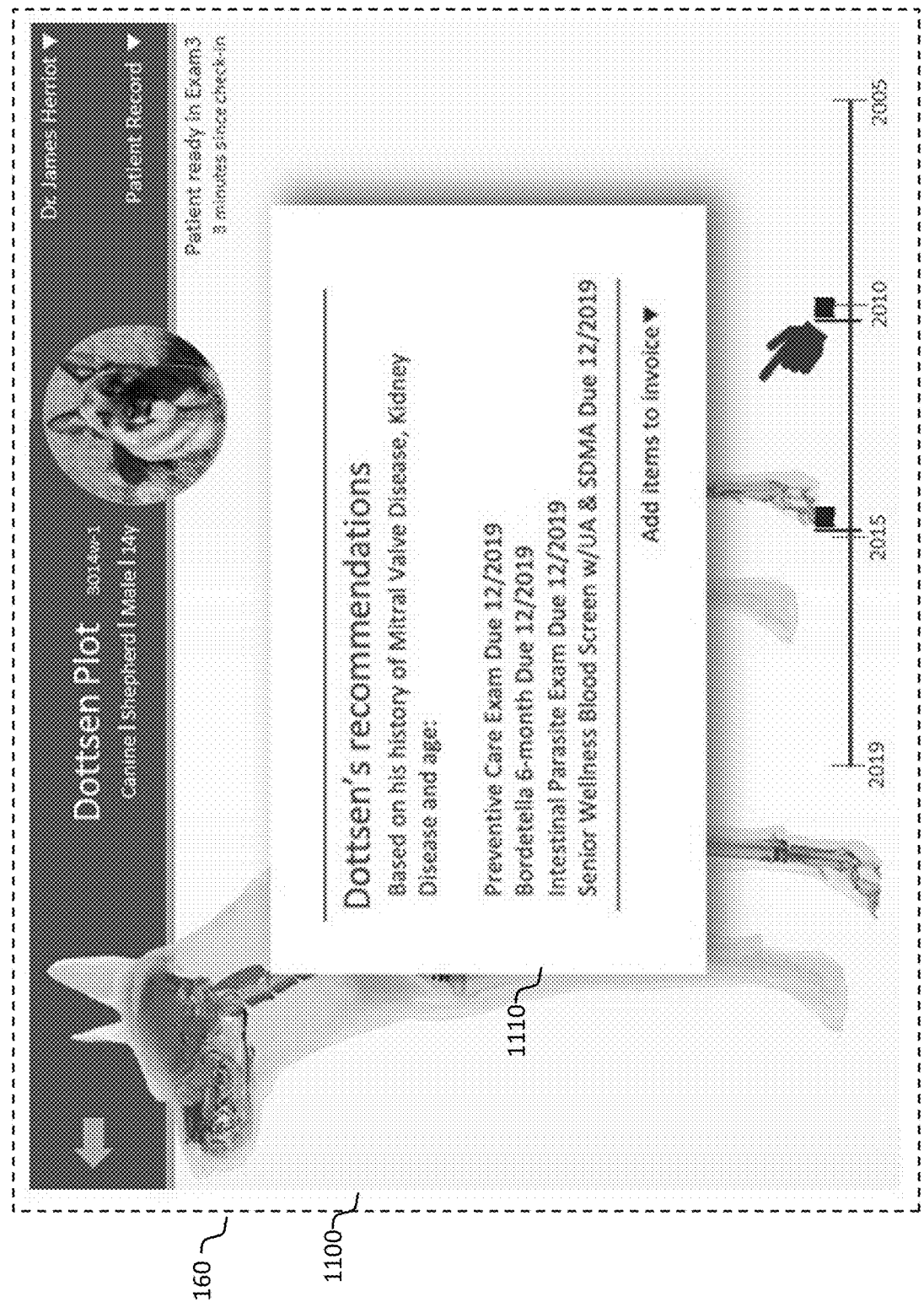
FIG. 11 shows another example graphical user interface screen of the patient information management system, according to some embodiments of the present disclosure.

In some embodiments, the third display area 430 (FIG. 4) includes a recommended protocol icon, button, or selectable menu item 434 (FIG. 4) that displays a recommendation screen 1100 of the graphical user interface 370 (FIG. 4), as shown in FIG. 11. In some embodiments, the recommendations 1110 are based on one or more of the patient's medical history or the veterinarian's observations during the current visit. In some embodiments, the recommendations 1110 may include suggestions for further tests, follow-up visits, and treatment plans.

Referring to FIGS. 4 and 6-12, a high-level flowchart of a method 1200 of user interaction with the graphical user interface 370 is depicted. In some embodiments, in step S1210, the user selects the patient whose information is to be accessed and displayed on the graphical user interface 370. In step S1220, the graphical user interface 370 is updated to display the selected patient's demographic information in the first display area 410, the patient's current clinical visit information in the second display area 420, a summary of the patient's medical history in the third display area 430, a timeline 440 of the patient's medical history, and an avatar 450 of the patient. In some embodiments, the user interacts with the information displayed on the graphical user interface 370 by selecting an area of interest on the avatar (step S1230) or selecting an area of interest on the icon selection screen 630 (step S1240). In some embodiments, the icon selection screen 600 is displayed in the fourth display area 630 of the graphical user interface 370 when the user selects a patient record button, icon, or menu item 432 in the second display area 420. In step S1250, the third display area 430 is updated to show detailed medical information about the selected area of interest. If the detailed medical information includes additional information such as videos or images, as shown in the example of FIG. 10, these may be displayed in step S1260 by selecting the additional information from the third display area 430.

In some embodiments, the user may, in step S1270, select an event on the timeline 440. The method then proceeds to step S1250, where detailed medical information associated with the selected event is displayed in the third display area 430. If the detailed medical information includes additional information such as videos or images, as shown in the example of FIG. 10, these may be displayed in step S1260 by selecting the additional information from the third display area 430.

In a first aspect A1, the present disclosure provides a patient information system comprising an image capture device configured to capture an image of a patient; a display; a memory configured to store a program; and a processor communicatively connected to the memory and configured to execute the program to: generate a virtual representation of the patient based on the image of the patient captured by the image capture device; display a graphical user interface on the display, the graphical user interface including a first screen portion configured to display the virtual representation of the patient and a second screen portion configured to display information; receive a selection of an area of interest on the virtual representation of the patient; receive first clinical and diagnostic information associated with the selected area of interest; and display the received first clinical and diagnostic information in the second screen portion of the graphical user interface.

In a second aspect A2, the present disclosure provides the system according to aspect A1, wherein the graphical user interface includes a third screen portion displaying a timeline associated with the patient information, and wherein the processor is configured to further execute the program to: receive a selection of a time period on the timeline; receive second clinical and diagnostic information associated with the selected time period; and display the received second clinical and diagnostic information in the second screen portion of the graphical user interface instead of the received first clinical and diagnostic information.

In a third aspect A3, the present disclosure provides the system according to aspect A2, wherein the processor is configured to further execute the program to display, on the virtual representation of the patient, one or more visual indicators indicating one or more areas of interest associated with the received second clinical and diagnostic information.

In a fourth aspect A4, the present disclosure provides the system according to any one of aspects A1-A3, further including a plurality of databases configured to store clinical and diagnostic information, including the first clinical and diagnostic information and the second clinical and diagnostic information, for the patient.

In a fifth aspect A5, the present disclosure provides the system according to aspect A4, wherein the processor is configured to further execute the program to display, on the virtual representation of the patient, one or more visual indicators indicating one or more areas of interest associated with the stored clinical and diagnostic information for the patient.

In a sixth aspect A6, the present disclosure provides the system according to aspects A4 or A5, wherein the processor is configured to further execute the program to display, in the second screen portion of the graphical user interface, one or more icons corresponding to one or more areas of interest associated with the stored clinical and diagnostic information for the patient.

In a seventh aspect A7, the present disclosure provides the system according to aspect A6, wherein the one or more icons depict one or more organs of the patient.

In an eighth aspect A8, the present disclosure provides the system according to aspects A6 or A7, wherein the processor is configured to further execute the program to: receive a selection of an icon displayed in the second screen portion of the graphical user interface; receive third clinical and diagnostic information associated with the selected icon; and display the received third clinical and diagnostic information in the second screen portion of the graphical user interface.

In a ninth aspect A9, the present disclosure provides the system according to any one of aspects A4-A8, wherein the stored clinical and diagnostic information includes at least one of diagnoses, medications, treatment plans, progress notes, patient problems, vaccines, test results, and imaging data.

In a tenth aspect A10, the present disclosure provides the system according to any one of aspects A1-A9, wherein the virtual representation of the patient is a photo-realistic representation generated by texture mapping one or more photographic images of the patient to a 3D model of the patient.

In an eleventh aspect A11, the present disclosure provides the system according to any one of aspects A1-A10, wherein the graphical user interface includes a fourth screen portion displaying patient demographic information.

In a twelfth aspect A12, the present disclosure provides the system according to any one of aspects A1-A11, wherein the graphical user interface includes a fifth screen portion displaying clinical visit information.

In a thirteenth aspect A13, the present disclosure provides a processor executed patient information display method comprising capturing an image of a patient; generating a virtual representation of the patient based on the captured image of the patient; displaying a graphical user interface on a display, the graphical user interface including a first screen portion configured to display the virtual representation of the patient and a second screen portion configured to display information; receiving a selection of an area of interest on the virtual representation of the patient; receiving first clinical and diagnostic information associated with the selected area of interest; and displaying the received first clinical and diagnostic information in the second screen portion of the graphical user interface.

In a fourteenth aspect A14, the present disclosure provides the method according to aspect A13, further comprising displaying, on a third screen portion of the graphical user interface, a timeline associated with the patient information; receiving a selection of a time period on the timeline; receiving second clinical and diagnostic information associated with the selected time period; and displaying the received second clinical and diagnostic information in the second screen portion of the graphical user interface instead of the received first clinical and diagnostic information.

In a fifteenth aspect A15, the present disclosure provides the method according to aspect A14, further comprising displaying, on the virtual representation of the patient, one or more visual indicators indicating one or more areas of interest associated with the received second clinical and diagnostic information.

In a sixteenth aspect A16, the present disclosure provides the method according to any one of aspects A13-A15, further comprising receiving the first clinical and diagnostic information and the second clinical and diagnostic information for the patient from a plurality of databases configured to store clinical and diagnostic information.

In a seventeenth aspect A17, the present disclosure provides the method according to aspect A16, further comprising displaying, on the virtual representation of the patient, one or more visual indicators indicating one or more areas of interest associated with the stored clinical and diagnostic information for the patient.

In an eighteenth aspect A18, the present disclosure provides the method according to any one of aspects A16 or A17, further comprising displaying, in the second screen portion of the graphical user interface, one or more icons corresponding to one or more areas of interest associated with the stored clinical and diagnostic information for the patient.

In a nineteenth aspect A19, the present disclosure provides the method according to aspect A18, wherein the one or more icons depict one or more organs of the patient.

In a twentieth aspect A20, the present disclosure provides the method according to any one of aspects A18 or A19, further comprising receiving a selection of an icon displayed in the second screen portion of the graphical user interface; receiving third clinical and diagnostic information associated with the selected icon; and displaying the received third clinical and diagnostic information in the second screen portion of the graphical user interface.

In a twenty-first aspect A21, the present disclosure provides the method according to any one of aspects A16-A20, wherein the stored clinical and diagnostic information includes at least one of diagnoses, medications, treatment plans, progress notes, patient problems, vaccines, test results, and imaging data.

In a twenty-second aspect A22, the present disclosure provides the method according to any one of aspects A13-A21, wherein the virtual representation of the patient is a photo-realistic representation generated by texture mapping one or more photographic images of the patient to a 3D model of the patient.

In a twenty-third aspect A23, the present disclosure provides the method according to any one of aspects A13-A22, further comprising displaying patient demographic information on a fourth screen portion of the graphical user interface.

In a twenty-fourth aspect A24, the present disclosure provides the method according to any one of aspects A13-A23, further comprising displaying clinical visit information on a fifth screen portion of the graphical user interface.

In a twenty-fifth aspect A25, the present disclosure provides a non-transitory computer readable storage medium configured to store a program that executes a patient information display method, the method comprising capturing an image of a patient; generating a virtual representation of the patient based on the captured image of the patient; displaying a graphical user interface on a display, the graphical user interface including a first screen portion configured to display the virtual representation of the patient and a second screen portion configured to display information; receiving a selection of an area of interest on the virtual representation of the patient; receiving first clinical and diagnostic information associated with the selected area of interest; and displaying the received first clinical and diagnostic information in the second screen portion of the graphical user interface.

In a twenty-sixth aspect A26, the present disclosure provides the medium according to aspect A25, wherein the method further comprises displaying, on a third screen portion of the graphical user interface, a timeline associated with the patient information; receiving a selection of a time period on the timeline; receiving second clinical and diagnostic information associated with the selected time period; and displaying the received second clinical and diagnostic information in the second screen portion of the graphical user interface instead of the received first clinical and diagnostic information.

In a twenty-seventh aspect A27, the present disclosure provides the medium according to aspect A26, wherein the method further comprises displaying, on the virtual representation of the patient, one or more visual indicators indicating one or more areas of interest associated with the received second clinical and diagnostic information.

In a twenty-eighth aspect A28, the present disclosure provides the medium according to any one of aspects A25-A28, wherein the method further comprises receiving the first clinical and diagnostic information and the second clinical and diagnostic information for the patient from a plurality of databases configured to store clinical and diagnostic information.

In a twenty-ninth aspect A29, the present disclosure provides the medium according to aspect A28, wherein the method further comprises displaying, on the virtual representation of the patient, one or more visual indicators indicating one or more areas of interest associated with the stored clinical and diagnostic information for the patient.

In a thirtieth aspect A30, the present disclosure provides the medium according to any one of aspects A28 or A29, wherein the method further comprises displaying, in the second screen portion of the graphical user interface, one or more icons corresponding to one or more areas of interest associated with the stored clinical and diagnostic information for the patient.

In a thirty-first aspect A31, the present disclosure provides the medium according to aspect A30, wherein the one or more icons depict one or more organs of the patient.

In a thirty-second aspect A32, the present disclosure provides the medium according to any one of aspects A30 or A31, wherein the method further comprises receiving a selection of an icon displayed in the second screen portion of the graphical user interface; receiving third clinical and diagnostic information associated with the selected icon; and displaying the received third clinical and diagnostic information in the second screen portion of the graphical user interface.

In a thirty-third aspect A33, the present disclosure provides the medium according to any one of aspects A28-A32, wherein the stored clinical and diagnostic information includes at least one of diagnoses, medications, treatment plans, progress notes, patient problems, vaccines, test results, and imaging data.

In a thirty-fourth aspect A34, the present disclosure provides the medium according to any one of aspects A25-A33, wherein the virtual representation of the patient is a photo-realistic representation generated by texture mapping one or more photographic images of the patient to a 3D model of the patient.

In a thirty-fifth aspect A35, the present disclosure provides the medium according to any one of aspects A25-A34, wherein the method further comprises displaying patient demographic information on a fourth screen portion of the graphical user interface.

In a thirty-sixth aspect A36, the present disclosure provides the medium according to any one of aspects A25-A35, wherein the method further comprises displaying clinical visit information on a fifth screen portion of the graphical user interface.

Subsets or combinations of various embodiments described above provide further embodiments.

These and other changes can be made to the embodiments of the present disclosure in light of the above-detailed description and still fall within the scope of the present disclosure. In general, in the following claims, the terms used should not be construed to limit the disclosure to the specific embodiments disclosed in the specification.

What is claimed is:

1. A veterinary patient information system comprising:
   an image capture device configured to capture an image of a veterinary patient;
   a display;
   a memory configured to store a program; and
   a processor communicatively connected to the memory and configured to execute the program to:
   generate a virtual representation of the patient based on the image of the patient captured by the image capture device, wherein the virtual representation is a photo-realistic representation generated by texture mapping one or more photographic images of the patient to a 3D model of the patient;
   display a graphical user interface on the display, the graphical user interface including a first screen portion configured to display the virtual representation of the patient, a second screen portion configured to display information, a third screen portion configured to display a timeline associated with the patient information, and a fourth screen portion configured to display one or more icons depicting one or more organs of the patient;
   receive a selection of an area of interest, corresponding to a selection of an icon of the one or more icons, on the virtual representation of the patient;
   receive first clinical and diagnostic information associated with the selected area of interest;
   display the received first clinical and diagnostic information in the second screen portion of the graphical user interface;
   display, on the virtual representation of the patient, one or more visual indicators depicting a progression of a disease associated with the selected area of interest, based on the received first clinical and diagnostic information;
   receive a selection of a time period on the timeline;
   receive second clinical and diagnostic information associated with the selected area of interest for the selected time period;
   display the received second clinical and diagnostic information in the second screen portion of the graphical user interface instead of the received first clinical and diagnostic information; and
   update, on the virtual representation of the patient, the displayed one or more visual indicators depicting the progression of the disease associated with the selected area of interest, based on the received second clinical and diagnostic information.

2. The system according to claim 1, further including a plurality of databases configured to store clinical and diagnostic information, including the first clinical and diagnostic information and the second clinical and diagnostic information, for the patient.

3. The system according to claim 2, wherein the stored clinical and diagnostic information includes at least one of diagnoses, medications, treatment plans, progress notes, patient problems, vaccines, test results, and imaging data.

4. The system according to claim 1, wherein the graphical user interface includes a fifth screen portion displaying patient demographic information.

5. The system according to claim 1, wherein the graphical user interface includes a sixth screen portion displaying clinical visit information.

6. A processor executed veterinary patient information display method comprising:
   capturing an image of a veterinary patient;
   generating a virtual representation of the patient based on the captured image of the patient, wherein the virtual representation is a photo-realistic representation generated by texture mapping one or more photographic images of the patient to a 3D model of the patient;
   displaying a graphical user interface on a display, the graphical user interface including a first screen portion configured to display the virtual representation of the patient, a second screen portion configured to display information, a third screen portion configured to display a timeline associated with the patient information, and a fourth screen portion configured to display one or more icons depicting one or more organs of the patient;

receiving a selection of an area of interest, corresponding to a selection of an icon of the one or more icons, on the virtual representation of the patient;

receiving first clinical and diagnostic information associated with the selected area of interest;

displaying the received first clinical and diagnostic information in the second screen portion of the graphical user interface;

displaying, on the virtual representation of the patient, one or more visual indicators depicting a progression of a disease associated with the selected area of interest, based on the received first clinical and diagnostic information;

receiving a selection of a time period on the timeline;

receiving second clinical and diagnostic information associated with the selected area of interest for the selected time period;

displaying the received second clinical and diagnostic information in the second screen portion of the graphical user interface instead of the received first clinical and diagnostic information; and updating, on the virtual representation of the patient, the displayed one or more visual indicators depicting the progression of the disease associated with the selected area of interest, based on the received second clinical and diagnostic information.

7. A non-transitory computer readable storage medium configured to store a program that executes a veterinary patient information display method, the method comprising:

capturing an image of a veterinary patient;

generating a virtual representation of the patient based on the captured image of the patient, wherein the virtual representation is a photo-realistic representation generated by texture mapping one or more photographic images of the patient to a 3D model of the patient;

displaying a graphical user interface on a display, the graphical user interface including a first screen portion configured to display the virtual representation of the patient, a second screen portion configured to display information, a third screen portion configured to display a timeline associated with the patient information, and a fourth screen portion configured to display one or more icons depicting one or more organs of the patient;

receiving a selection of an area of interest, corresponding to a selection of an icon of the one or more icons, on the virtual representation of the patient;

receiving first clinical and diagnostic information associated with the selected area of interest;

displaying the received first clinical and diagnostic information in the second screen portion of the graphical user interface;

displaying, on the virtual representation of the patient, one or more visual indicators depicting a progression of a disease associated with the selected area of interest, based on the received first clinical and diagnostic information;

receiving a selection of a time period on the timeline;

receiving second clinical and diagnostic information associated with the selected area of interest for the selected time period;

displaying the received second clinical and diagnostic information in the second screen portion of the graphical user interface instead of the received first clinical and diagnostic information; and updating, on the virtual representation of the patient, the displayed one or more visual indicators depicting the progression of the disease associated with the selected area of interest, based on the received second clinical and diagnostic information.

\* \* \* \* \*